(12) United States Patent
Howarth (10) Patent No.: US 9,419,814 B2
(45) Date of Patent: Aug. 16, 2016

(54) EVENT / CALENDAR BASED AUTO-START OF VIRTUAL DISKS FOR DESKTOP VIRTUALIZATION

(75) Inventor: Arthur G. Howarth, Orleans (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 980 days.

(21) Appl. No.: 12/397,116

(22) Filed: Mar. 3, 2009

(65) Prior Publication Data

US 2010/0229185 A1    Sep. 9, 2010

(51) Int. Cl.
G06F 9/44    (2006.01)
G06F 9/46    (2006.01)
H04L 12/26   (2006.01)
H04L 12/24   (2006.01)

(52) U.S. Cl.
CPC .......... H04L 12/2602 (2013.01); H04L 43/00 (2013.01); H04L 41/22 (2013.01); H04L 43/0817 (2013.01); H04L 43/16 (2013.01)

(58) Field of Classification Search
None
See application file for complete search history.

(56) References Cited

U.S. PATENT DOCUMENTS

| 7,577,722 B1* | 8/2009 | Khandekar et al. ........... 709/220 |
| 8,677,353 B2* | 3/2014 | Machida ........................... 718/1 |
| 2008/0045172 A1* | 2/2008 | Narayanaswami et al. ........................ 455/187.1 |
| 2010/0199285 A1* | 8/2010 | Medovich ........... G06F 9/45533 718/104 |

FOREIGN PATENT DOCUMENTS

WO    WO 2008084826 A1 *  7/2008

OTHER PUBLICATIONS

Rich Brambley; The Magic of Citrix XenDesktop is Ardence (Provisioning Server); Jul. 1, 2008; 2 pages.*

(Continued)

*Primary Examiner* — H S Sough
*Assistant Examiner* — Kimberly Jordan
(74) *Attorney, Agent, or Firm* — Polsinelli PC (57) ABSTRACT

In one embodiment, an occurrence of a triggering event is detected and it is determined that a virtual disk will be assembled in response to the triggering event. A time is determined at which the virtual disk will be assembled. When it is ascertained that the assembly time occurs, the virtual disk is assembled. It may also be determined whether a connection request is received for the virtual disk during a predetermined time.

27 Claims, 10 Drawing Sheets

(56) References Cited

OTHER PUBLICATIONS

Borja Sotomayor, Ruben Santiago Montero, Ignacio Martin Llorente, and Ian Foster; Capacity Leasing in Cloud Systems using the OpenNebula Engine; Oct. 23, 2008; 5 pages.*

How to Rebalance Provisioning Server Target Devices in High Availability Configurations; Aug. 20, 2008; 1 page.*

ACTORS—Project Overview; http://www.actors-project.eu/index.php?page=project-overview; archived Sep. 1, 2008; 3 pages.*

David Davis ; How to schedule tasks with the VMware Infrastructure Client and ESX Server; Jun. 18, 2008; 6 pages; http://www.virtualizationadmin.com/articles-tutorials/vmware-esx-and-vsphere-articles/general/schedule-tasks-vmware-infrastructure-client-esx-server.html.*

"Desktop Virtualization." Wikipedia, [online] [retrieved on Sep. 30, 2008] Retrieved from: http://en.wikipedia.org/wiki/Desktop_virtualization, 3 pages.

"Disk Image Emulator," Wikipedia, [online] [retrieved on Sep. 30, 2008] Retrieved from: http://en.wikipedia.org/wiki/Disk_image_emulator, 3 pages.

"Virtual Drive," Wikipedia, [online] [retrieved on Sep. 30, 2008] Retrieved from: http://en.wikipedia.org/wiki/Virtual_drive, 2 pages.

"Virtual Machine," Wikipedia, [online] [retrieved on Sep. 30, 2008] Retrieved from: http://en.wikipedia.org/wiki/Virtual_machine, 10 pages.

* cited by examiner

EVENT / CALENDAR BASED AUTO-START OF VIRTUAL DISKS FOR DESKTOP VIRTUALIZATION

BACKGROUND OF THE INVENTION

The present invention relates to methods and apparatus for providing virtual desktops.

Installing and maintaining a network of separate personal computer ("PC") workstations and other client devices can be complex and time-consuming. Traditionally, the process has involved installing software on each PC, laptop computer or other client device. Corporate information technology ("IT") departments often spend a significant amount of time installing upgrades, resolving issues regarding users' personalization of client devices (e.g., desire to install or remove software), etc., during the course of maintaining such networks.

Desktop virtualization provides system administrators the ability to host and centrally manage desktop virtual machines in a data center while providing users the experience of having a conventional PC desktop. The virtual desktop may, for example, be provided by one or more servers in the data center to a thin client, which may or may not be located in an office of the enterprise. The virtual desktop may or may not be customized for a particular user. Although existing virtual desktop systems are adequate, it would be desirable to provide improved methods, devices and systems.

EXAMPLE EMBODIMENTS

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. For example, the steps of methods shown and described herein are not necessarily performed in the order indicated. It should also be understood that the methods of the invention may include more or fewer steps than are indicated.

Device functionality may be apportioned by grouping or dividing tasks in any convenient fashion. Therefore, when steps are described herein as being performed by a single device (e.g., a single server), the steps may alternatively be performed by multiple devices and vice versa.

Overview

In one embodiment, an occurrence of a triggering event is detected and it is determined that a virtual disk will be assembled in response to the triggering event. A time is determined at which the virtual disk will be assembled. When it is ascertained that the assembly time occurs, the virtual disk is assembled. It may also be determined whether a connection request is received for the virtual disk during a predetermined time.

Example Implementations

Figure 1:
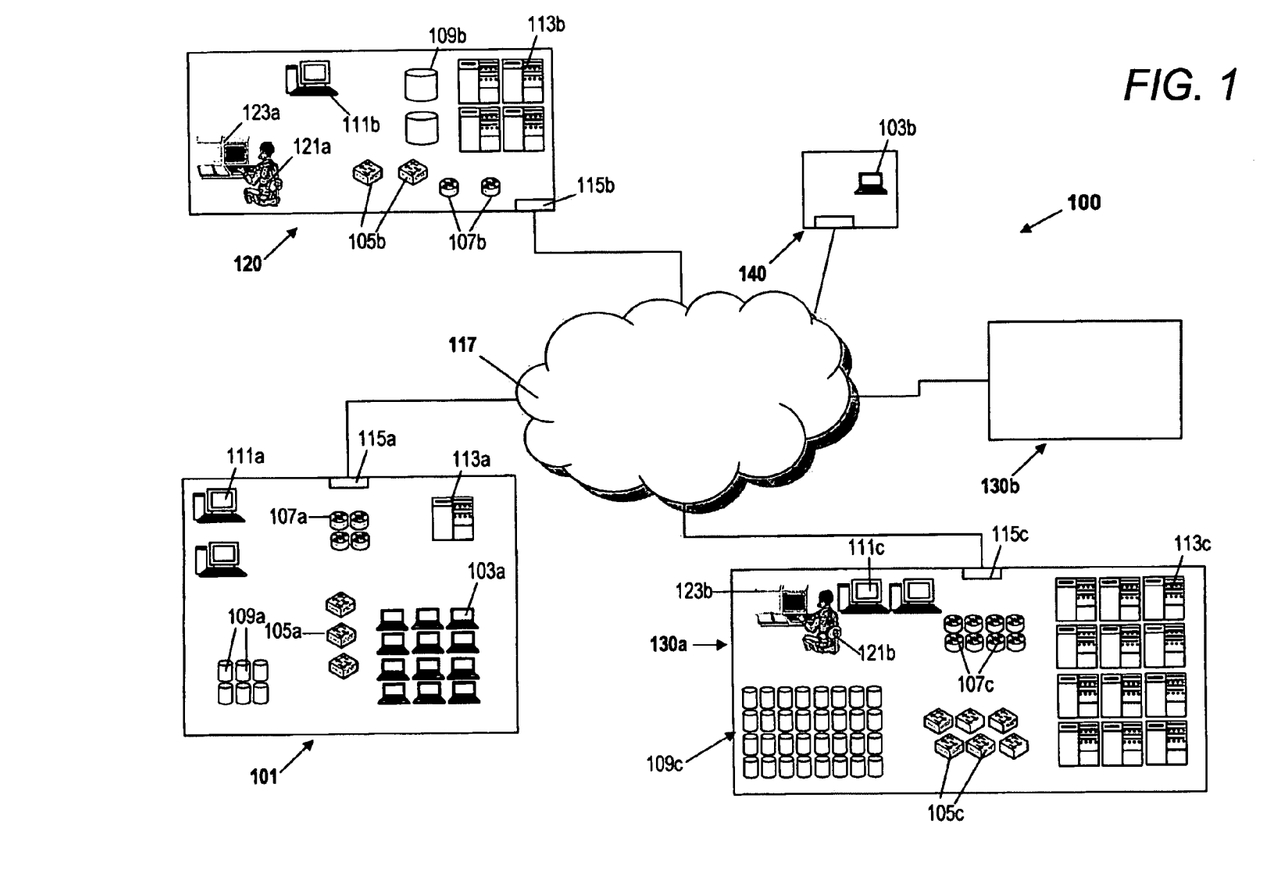
FIG. 1 is an example of a network that may be used to implement some embodiments described herein relating to virtual desktops.

Referring now to FIG. 1, example network 100 for providing desktop virtualization will now be described. Enterprise 101 includes a plurality of thin clients 103a. As used herein, the term "thin client" or the like may refer broadly to a "thin client" as the term is generally known in the art as well as to a more versatile device and/or related software, such as a diskless node or a hybrid client. As such, thin clients may be client computers and/or client software that depend, at least to some extent, on one or more central devices for processing activities but which may potentially have a range of processing capabilities. A thin client may or may not be a mobile device and vice versa.

In this example, at least some of the processing activities for thin clients 103a are provided by one or more data centers, such as data centers 130a and 130b. Accordingly, enterprise 101 includes various network devices for providing network connectivity not only between devices of enterprise 101 but also with devices elsewhere, including but not limited to data centers 130a and 130b. Such network devices include switches 105a, routers 107a and gateway 115a. In this example, enterprise 101 also includes its own storage devices 109a and server(s) 113a, as well as thick clients 111a, which are configured to perform significant stand-alone functionality independently of a central server or other such device.

If a user 121a wishes to have a data center provide a virtual desktop and/or other related services, the user 121a (in this example, Art) may initiate a communication via a connection request to a third party entity referred to herein as a "broker" or the like. One example broker 120 is illustrated in FIG. 1. In this example, software running on a thin client that Art is using communicates with one or more devices controlled by broker 120 when Art indicates that he wants to log on. Here, Art's thin client sends the connection request via Internet 117, by sending the connection request to an Internet Protocol ("IP") address associated with broker 120. This communication may or may not be across a secured link. Some implementations may involve communication over other types of networks 117, such as wide area networks, metropolitan area networks, campus area networks, etc.

Broker 120 provides gatekeeper functionality and may provide authentication services, e.g., via authentication software. Authentication software running on host device 111b, one of servers 113b and/or workstation 123a may cause an authentication challenge to be presented to the user 121a, e.g., in the form of a screen requiring Art to provide a username and password. If the user 121a can pass the authentication process, the broker device(s) will direct the user's connection request to the proper data center (in this example, data center 130a).

Other functionality described herein may be provided, at least in part, by devices controlled by broker 120, e.g., host device 111b, one of servers 113b and/or workstation 123a. For example, one or more such devices may be configured to monitor connection requests and store relevant data, e.g., the time, user identification data, enterprise identification data, whether a connection request originated from a device associated with an enterprise or from a device associated with a user's home (e.g., Art's thin client 103b depicted in his home 140), etc. Here, switches 105b, routers 107b and gateway 115b provide network connectivity for broker 120. Storage devices 109b store relevant data, which may include user and/or enterprise identification data, preference data, the time and number of connection requests, etc.

Data center 130a is configured to provide various services, including but not necessarily limited to desktop virtualization services, to users 121b and/or enterprises via Internet 117. Accordingly, data center 130a is configured for communication with Internet 117 via gateway 115c. Switches 105c and routers 107c provide network connectivity for devices of data center 130a, including storage devices 109c, host devices 111c, servers 113c and workstations 123b. Although no details of data center 130b are indicated in FIG. 1, data center 130b may include devices similar to those of data center 130a.

At least some of the devices of data center 130a may be configured to provide virtualization functionality. Such virtualization may enable the aggregation of multiple servers 113c, storage devices 109c, etc., into shared pools of resources that can provide desktop virtualization on demand, according to a schedule, in response to observed user and/or enterprise data, etc. Such responses may be made, for example, by applying a rule set such as those described herein.

Desktop virtual machines may be hosted and managed by data center 130a while providing users the experience of having a conventional PC desktop. The virtual desktop may, for example, be provided by one or more of servers 113c to thin clients 103a or 103b.

Accordingly, at least some of the devices of data center 130a are configured to assemble and/or launch virtual disks (also referred to herein as "virtual hard drives" or the like). Such devices may assemble a virtual hard drive to provide the functionality of a virtual desktop. These devices may assemble the virtual hard drive from an instance of an operating system ("OS") and instances of specified applications. The OS may be a "gold image" OS that has the latest updates, patches, etc. Depending on the implementation, personal data and/or configurations may be added. After assembly, the data center device(s) may initialize or "boot" the virtual hard drive in a manner much like initializing a physical hard drive of a laptop, a desktop PC, etc. These processes may be performed, at least in part, by devices that are executing appropriate software, e.g., VMware View™, VMware VDI™, Citrix XenDesktop™, etc.

Data center 130a may or may not customize the virtual desktops for a particular user, according to the implementation. Art's enterprise may allow Art's virtual desktop to be customized, at least to some extent, according to Art's personal preferences. For example, Art may wish to have Microsoft Excel™, Word™, PowerPoint™ and Skype™ available on his virtual desktop. Some implementations may pre-install a user's (or an enterprise's) versions of the applications and hold them in a separate repository. Some implementations can dynamically assemble a customized virtual drive from a "buffet" of software options, according to customer requests.

However, some enterprises (e.g., call centers) may prefer that data center 130a provide one or more types of "generic" virtual desktops that may be used by any person in a general category. For example, a call center may wish to have a first type of virtual desktop provided that is geared towards telemarketing, a second type of virtual desktop provided that is geared towards technical support, a third type of virtual desktop provided that is geared towards catalogue orders, etc.

Figure 2:
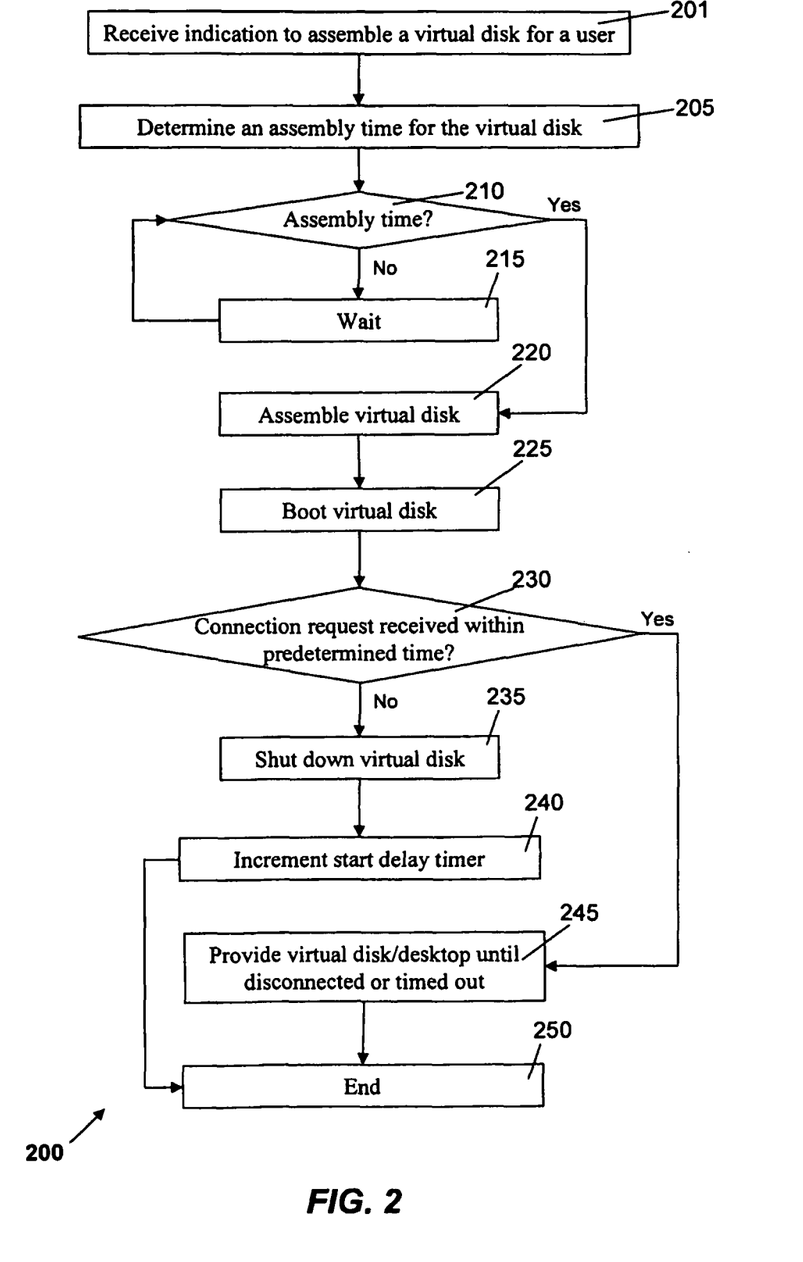
FIG. 2 is a flow chart that outlines steps of a method for providing virtual desktops.

Referring now to FIG. 2, the steps of method 200 will now be described. In some implementations of the invention, the steps of method 200 may be performed, at least in part, by one or more devices in a data center and/or operating under the control of a connection broker, e.g., by one or more servers, host devices, switches, routers, etc. In some implementations, a portion of a device (such as a line card of a network device, a blade of a blade server, an application-specific integrated circuit ["ASIC"], a programmable logic device such as a field-programmable gate array ["FPGA"], etc.) may be configured to perform at least some of these steps, or other steps described herein. Some implementations may be performed, at least in part, by a client device, e.g., by a laptop computer, a thin terminal, etc.

In step 201, an indication is received to assemble a virtual disk for a user. For example, a user, the user's supervisor, personal assistant, IT personnel, etc., could provide such an indication to a broker. In turn, the broker could provide such an indication to a data center. In step 205, an assembly time is determined. In some instances, it may be determined that the assembly time is "immediately" or "as soon as possible." If so, it may be determined in step 210 that the assembly time is the present moment. Alternatively, the system may wait at 215 until the assembly time. The virtual disk may be assembled (step 220) and initialized (step 225) right away.

However, step 201 may comprise receiving an indication that the virtual disk should be ready at a future time. If so, determining the assembly time in step 205 may involve determining the expected time required for steps 220 and 225, then subtracting these times from the indicated future time. For example, a person (e.g., Art) may send the indication received in step 201 from a first device, e.g., a Blackberry™ or other personal digital assistant, from a cellular telephone, from a laptop, etc.

The indication may be sent in any convenient manner and via any convenient protocol, e.g., via email, via Short Message Service ("SMS") protocol, via Extensible Markup Language ("XML"), etc. The indication may be sent via a voice message, e.g., to a voice recognition system. The indication may be sent to a voice operated system, e.g., "Press or say one to load your terminal environment. Press or say two to shut it down."

Suppose Art sends an indication that is received at 1 p.m. on Sunday and states that Art will need his virtual desktop to be ready by 2 p.m. on Sunday. If it normally takes about 20 minutes to assemble and boot Art's virtual hard drive, the data center may initiate the process at approximately 1:40 p.m. If Art makes a connection request (e.g., from one of thin clients 103a depicted in FIG. 1) at 2 p.m., his virtual desktop should be ready. Art will not need to waste time waiting for his virtual desktop to initialize.

Other indications may or may not be associated with a particular person. Some indications may be event-driven, e.g., for emergency services. For example, when there is an earthquake a predetermined number of virtual desktops could be created, e.g., 4 for fire fighting operations, 3 for police, 3 for ambulance services.

A virtual disk scheduler may perform, at least in part, the underlying calculations involved in step 205. Alternatively (or additionally), a virtual disk scheduler may provide the indication received in step 201. For example, the virtual disk scheduler may determine that an event or other "trigger" has occurred, or will occur at a predetermined time. This determination may be made in response to receiving an indication from another device, with reference to a calendar, with reference to a database of observed user activity, etc. Such a determination may cause the virtual disk scheduler to determine a virtual disk assembly time and/or to cause a virtual disk to be assembled immediately.

The virtual disk scheduler may be implemented as hardware, software or firmware within data center 130*a*. In some such implementations, one or more of thick clients 111*c*, servers 113*c* or workstation 123*b* may implement a virtual disk scheduler. However, the virtual disk scheduler could be implemented by devices in other locations and/or controlled by other entities, e.g., devices controlled by broker 120 or devices controlled by enterprise 101.

As discussed in more detail below, a virtual disk scheduler may provide a variety of capabilities. Some virtual disk schedulers may implement a calendaring function for scheduling virtual disk assembly times according to express indications. For example, Art may request that a virtual desktop be created by 8 a.m. every weekday morning. This feature may be overridden if, for example, Art is scheduled to be on vacation. On the other hand, if Art has a meeting scheduled for 7:30 a.m., Art's virtual desktop could be automatically scheduled (e.g., by reference to a Microsoft Outlook™ or another such calendaring system) to be ready at 7:30 a.m. instead of 8 a.m. Some events may involve customized versions of a user's virtual desktop. For example, on the day of Art's presentation, Art's virtual desktop may include presentation software that is not normally included in his virtual desktop.

The indications may pertain to an individual user, as described above, or they may pertain to "generic" virtual desktops that may be used by any person in a general category. As noted above, a call center may wish to have a first type of virtual desktop provided that is geared towards telemarketing, a second type of virtual desktop provided that is geared towards technical support, a third type of virtual desktop provided that is geared towards catalogue orders, etc. The call center may schedule, via a virtual disk scheduler, that predetermined numbers of such generic virtual desktops be available at different times, e.g., 100 at 9 a.m., 150 at 9:30 a.m., etc.

The most CPU-intensive task for a virtual disk is generally the process of initializing or "booting up." Therefore, a virtual disk scheduler may spread out the times for initializing virtual disks to avoid extreme levels of CPU usage during peak initialization times. Some examples are described below with reference to FIG. 3.

In some implementations, the determinations of a virtual disk scheduler may take into account data regarding the time of connection requests, the number of connection requests received within a predetermined time and/or other such data. For example, a virtual disk scheduler may evaluate whether a particular user has made a connection request within a predetermined time of when the user's virtual disk was requested to be ready. As such, a virtual disk scheduler may "learn" from a user's and/or entity's past behavior and may respond accordingly.

One simple example is indicated in FIG. 2. In this example, it is determined in step 230 whether a connection request is received for the assembled and initialized virtual disk within a predetermined time. This determination may be made, for example, by a device controlled by broker 120 or by data center 130*a*. If the connection request is received within the predetermined time, the virtual disk will be provided. (Step 245.) For example, the virtual disk may be provided until the user logs off, until an inactivity timer expires, etc. The process may then end at 250.

If it is determined in step 230 that the connection request is not received within the predetermined time, at least one predetermined action may be taken: here, one predetermined action is that the virtual disk is shut down. (Step 235.) In this example, another predetermined action is taken: a delay timer associated with this user is incremented. (Step 240.) For example, the next time that this user requests that a virtual disk be ready by time T, the virtual disk scheduler will determine that the virtual disk will be ready no sooner than time T plus a time increment.

In some implementations, the predetermined time and/or the time increment may be adjustable, e.g., according to input from a data center operator and/or from an entity with which the user is associated. From the data center's perspective, it would be advantageous to have a relatively smaller predetermined time and/or a relatively larger time increment, in order to minimize the number of active virtual disks at any given time. From the entity and/or user's perspective, it would be advantageous to have a relatively larger predetermined time and/or a smaller time increment, in order to maximize user convenience and minimize wasted time.

Accordingly, in some implementations such parameters may be linked to a fee schedule. For example, a data center may offer a standard rate for keeping the virtual disk ready for a first predetermined time (e.g., for 30 minutes), a premium rate for keeping the virtual disk ready for a second predetermined time (e.g., for 1 hour) and a reduced rate for keeping the virtual disk ready for a third predetermined time (e.g., for 15 minutes).

A similar fee schedule may apply to the delay timer increment. For example, the data center may offer a standard rate for a first delay timer increment (e.g., 5 minutes), a premium rate for a second, smaller delay timer increment (e.g., for 1 minute) and a reduced rate for a third, larger delay timer increment (e.g., 10 minutes). The delay timer increment may or may not be associated or "bundled" with the predetermined time.

In some implementations, a virtual disk scheduler may evaluate the aggregated data of a particular group or subgroup. In some such implementations, the responses may involve changing a time that one or more virtual disks will be ready in the future, changing a number of virtual disks will be ready in the future and/or changing a fee.

Figure 3:
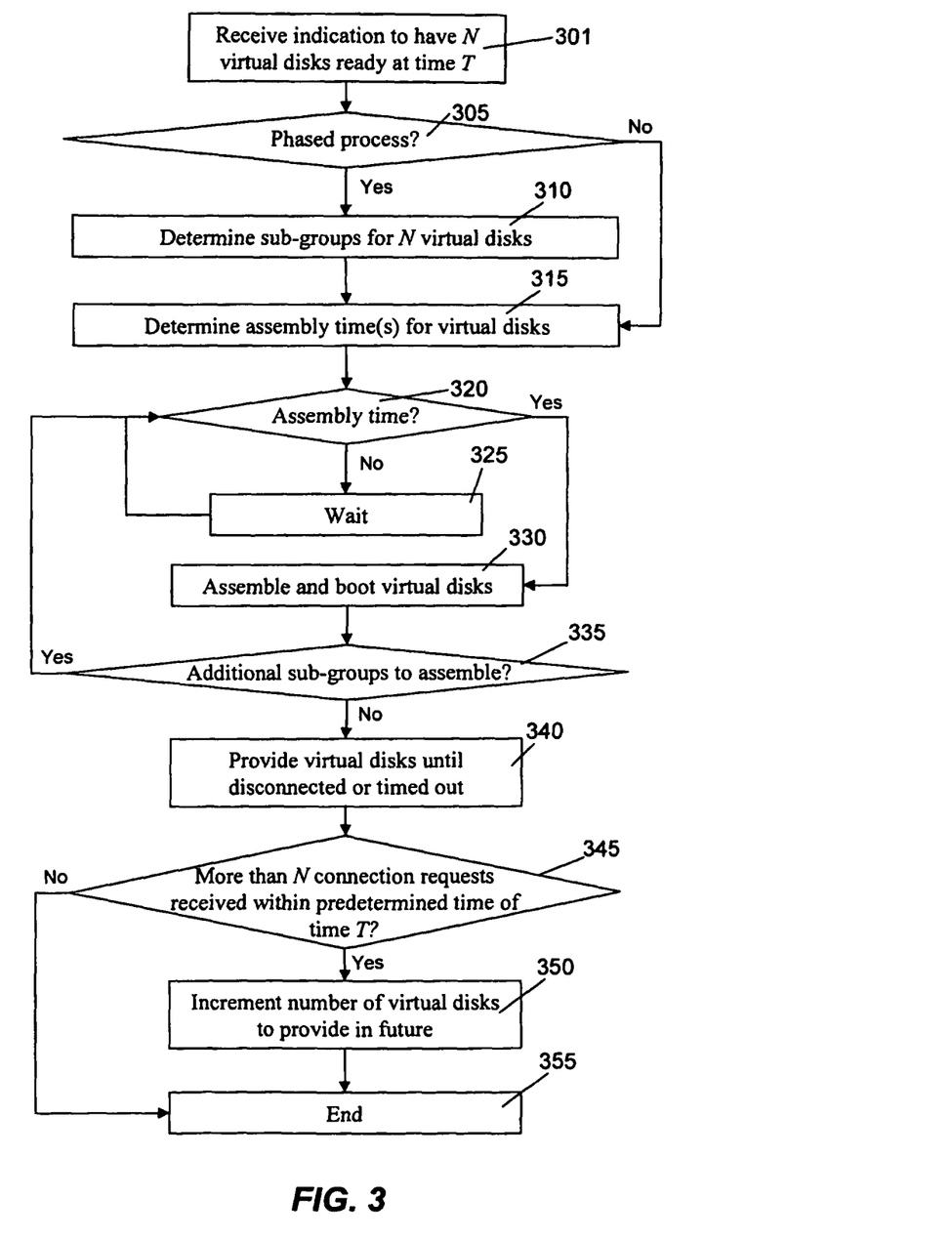
FIG. 3 is a flow chart that outlines steps of an alternative method for providing virtual desktops.

One such example will now be described with reference to FIG. 3. In step 301, an indication is received to have N virtual disks ready at a predetermined time T The indication may be received, e.g., by a device controlled by broker 120 or by data center 130*a* or 130*b*. In step 305, it will be determined (e.g., by a virtual disk scheduler operating on behalf of a data center) whether the process of assembling and/or initializing the virtual disks will be a phased process.

For example, if an indication is received in step 301 that a customer of the data center wants 50,000 virtual disks available at 9 a.m. and the assembly and initialization process takes an average of 10 minutes, the virtual disk scheduler may schedule the assembly time for at least some of these 50,000 virtual disks to be prior to 8:50 a.m. A virtual disk scheduler used by the data center may, e.g., determine that the time for assembly and/or initialization of the virtual disks will be spread out over a period of several hours prior to 8:50 a.m. This determination may take into account other expected requirements of the data center during this time period, e.g., the schedules and requirements of other customers.

In this example, if the virtual disk scheduler determines in step 305 that the process of assembling and/or initializing the virtual disks will be a phased process, the virtual disk scheduler will determine M sub-groups for the N virtual disks. For example, suppose that a customer wants 1,000 instances of the same virtual disk (N=1,000) to be available at 9 a.m. and that each instance takes approximately 15 minutes to assemble and boot. In step 310, the virtual disk scheduler may determine that the process will be divided into 4 phases. Accordingly, the virtual disk scheduler may determine that the N virtual disks will be divided into 4 sub-groups (M=4). The sub-groups may or may not be the same size.

In step 315, the virtual disk scheduler determines assembly times for the virtual disks. In this example, the virtual disk scheduler determines a separate assembly and/or boot time for each of the M sub-groups, such that all N virtual disks are ready by 9 a.m. on the day indicated. In one such implementation, M=2. The virtual disk scheduler may determine that the process for assembling and booting 500 virtual disks will start at a first time (e.g., at 8:30 a.m.) and that the process for assembling and booting the remaining 500 virtual disks will start at a second time (e.g., at 8:45 a.m.). However, these numbers, times, etc., are only provided by way of example. The virtual disk scheduler may determine the number of sub-groups, the number of virtual disks in each sub-group and the time at which the process starts for each sub-group in any convenient manner.

In some instances, it may be determined that the assembly time is "immediately" or "as soon as possible." If so, it may be determined in step 320 that the assembly time is the present moment. Alternatively, the system may wait at 325 until the assembly time. In this example, when the virtual disk scheduler determines that it is 8:30 a.m. on the day indicated (step 320), the virtual disk scheduler will cause the first sub-group of virtual disks to be assembled and initialized. (Step 330.) The virtual disk scheduler will determine in step 335 that there is another sub-group of virtual disks to assemble in step 335. When the virtual disk scheduler determines that it is 8:45 a.m. (step 320), the virtual disk scheduler will cause the second sub-group of virtual disks to be assembled and initialized. (Step 330.) The virtual disk scheduler will determine in step 335 that there is not another sub-group of virtual disks to assemble in step 335. The virtual disks may be made available until disconnected, timed out, etc. (Step 340.)

In some implementations, the virtual disk scheduler may determine how many connection requests are received for the N virtual disks within a predetermined time of time T. Such information may be used, for example, to determine the number of virtual disks that will be provided at time T on a future day.

Here, for example, the virtual disk scheduler will determine in step 345 whether more than N connection requests are received for the N virtual disks within a predetermined time of time T. The predetermined time may include times before time T and/or times after time T. For example, the predetermined time may extend from 8:30 a.m. to 9:30 a.m., from 8:45 a.m. to 9:45 a.m., etc. If the virtual disk scheduler determines that more than N connection requests are received within the predetermined time, the virtual disk scheduler may increment the number of virtual disks to be provided to the customer in the future in step 350. For example, if the same customer were to request that N virtual disks be available at time T on a subsequent day, the virtual disk scheduler may determine that N+(a number greater than N) virtual disks will be ready at time T on a subsequent day. The value of N+ may be determined, at least in part, on the number of connection requests received within the predetermined time of T on one or more previous days. The process may end at 355.

In some implementations, the virtual disk scheduler may determine whether fewer than N connection requests are received for the N virtual disks within a predetermined time of time T. If the virtual disk scheduler determines that fewer than N connection requests are received within the predetermined time, the virtual disk scheduler may decrement the number of virtual disks to be provided to the customer in the future. For example, if the same customer were to request that N virtual disks be available at time T on a subsequent day, the virtual disk scheduler may determine that N– (a number less than N) virtual disks will be ready at time T on a subsequent day. The value of N– may be determined, at least in part, on the number of connection requests received within the predetermined time of T on one or more previous days.

Start times of virtual disks associated with particular users may also be phased in. If an enterprise has 100 employees scheduled to start work at 8 a.m., starting a 15-minute boot-up process for all 100 employees at 7:45 a.m. may not be optimal. Instead, the boot-ups may be scheduled to phase in gradually in various sub-groups, e.g., 20 at 7:10, 20 at 7:20, 20 at 7:40 and 20 at 7:50, e.g., because it has been determined that the last 20 individuals normally come in late. If it is observed that one of the people in the 7:40 sub-group starts to come in 5 minutes earlier, she could be moved to an earlier sub-group, e.g., to the 7:30 sub-group.

Various methods and devices may be used to obtain data and/or adjust virtual disk scheduling parameters. For example, one or more devices controlled by a customer, a broker or a data center may execute a software "daemon" that measures various parameters of interest. The parameters to be measured may vary, e.g., according to the person or entity for which the data are being gathered.

For example, a data center operator may wish to measure the time it takes for a virtual disk to be assembled, to boot and to stabilize. A data center operator and a customer may both be interested in determining whether a user's applications launch properly and whether a user's desktop is available at the expected time. Although these times have been described above in terms of an individual fixed or average time, the actual times may depend, for example, on the timing of the boot-up and the resources available to the data center at that time. These data would be useful input in determining whether the virtual disk assembly and/or boot time should be adjusted.

Some daemons may be configured to monitor central processing unit ("CPU") usage, memory usage and/or other resource usage in a data center. Such daemons may be configured to measure aggregate resource usage and/or usage that pertains to an individual virtual disk (or other virtual machine). For example, one or more daemons may be configured to record a data center's aggregate resource usage at various times of day, days of the week, etc.

Some daemons may be configured to monitor when predetermined thresholds are exceeded, e.g., when CPU usage is over 10%, when memory usage is below 512 Mb, etc., to make a record of such events and/or to provide a notification of such events. A daemon may provide some such data to virtual disk scheduler, e.g., according to a predetermined rule set: "When the following metrics get to the following levels, send an indication to the virtual disk scheduler."

Some daemons (or the like) may be configured to capture historical use data for a user and/or an entity. For example, an enterprise or a data center may be interested in determining when a user is (or is not) using a virtual desktop. A daemon may have recorded data indicating, e.g., that a user has logged in on every Sunday for the past 10 Sundays at around 2 p.m. The daemon may provide such data to a virtual disk scheduler according to a notification parameter such as usage outside of normal business hours. A virtual disk scheduler may analyze these data and determine that on the 11th Sunday, the data center will launch the user's virtual disk in time to have it ready by 2 p.m. If the daemon reports that the user has not requested a connection for the virtual disk for 3 Sundays in a row, virtual disk scheduler may determine that the data center will not have it ready by 2 p.m. on the following Sunday.

Figure 4:
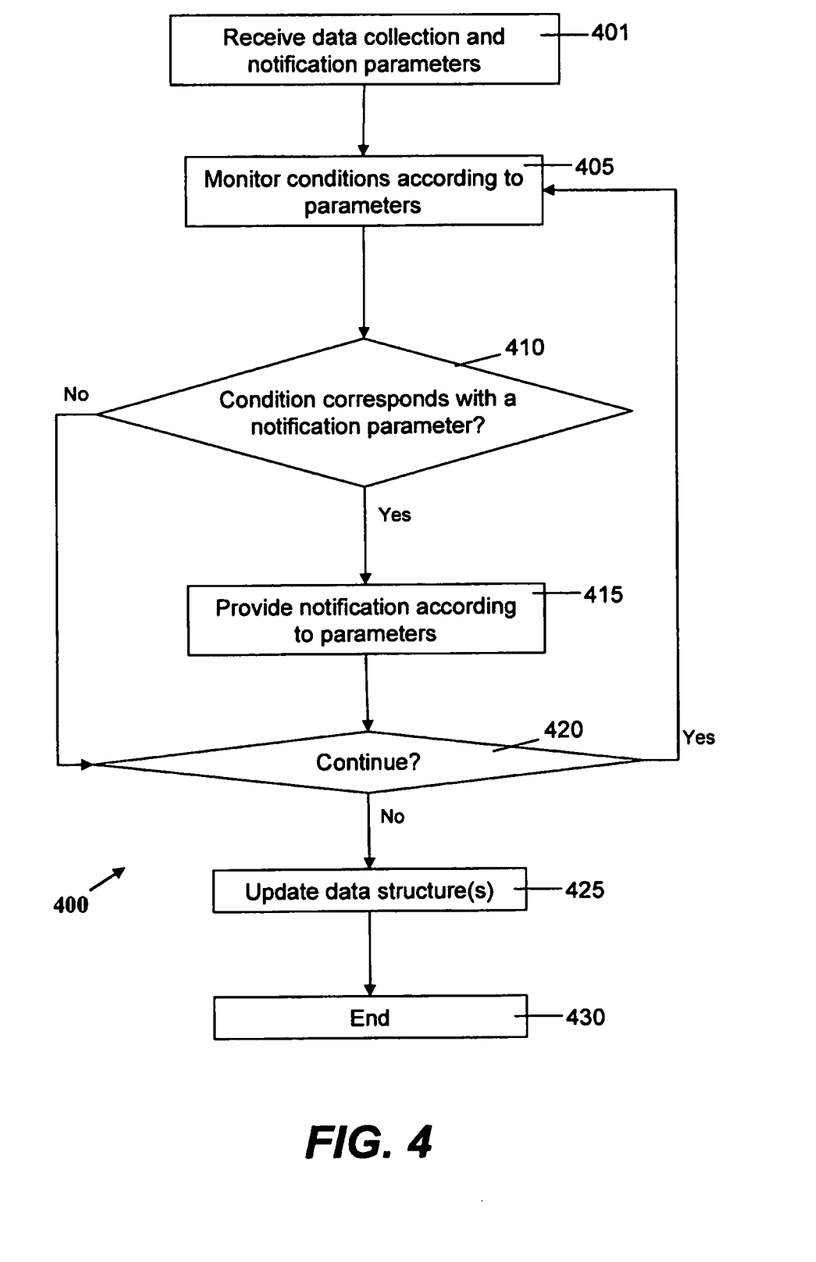
FIG. 4 is a flow chart that outlines steps of a method for providing information relating to the provision of virtual desktops according to data collection and/or notification parameters.

FIG. 4 outlines a generalized process 400 for establishing data parameters and enabling a daemon. In step 401, data collection and notification parameters for configuring a daemon are received. Examples of how such parameters may be received are provided below with reference to FIGS. 5 and 6A through 6D. In step 405, the daemon monitors conditions according to these parameters. When the daemon determines that a condition corresponds with a notification parameter (see step 410), a notification is provided. (Step 415.) For example, the daemon may add an entry in a field of a data structure that is accessible to a virtual disk scheduler. In step 420, the daemon determines whether the process will continue. If so, the daemon continues to monitor conditions according to its parameters. (Step 405.) If not, the process ends. (Step 430.) One or more relevant data structures may be updated to make a record of pertinent data, the time of data capture, etc. (Step 425.)

Various people, entities and/or devices may use data that is gathered by such a daemon. Different entities may have different criteria of interest.

Some examples of indicating data collection and/or notification parameters of interest will now be described with reference to FIGS. 5 and 6A through 6D. In step 501 of FIG. 5, a graphical user interface ("GUI") is provided. For example, such a GUI may be provided by one of thin terminals 103a or 103b (e.g., according to instructions from a server), by one of thick clients 111a, 111b or 111c, by one of workstations 123a or 123b, etc.

Figure 6A:
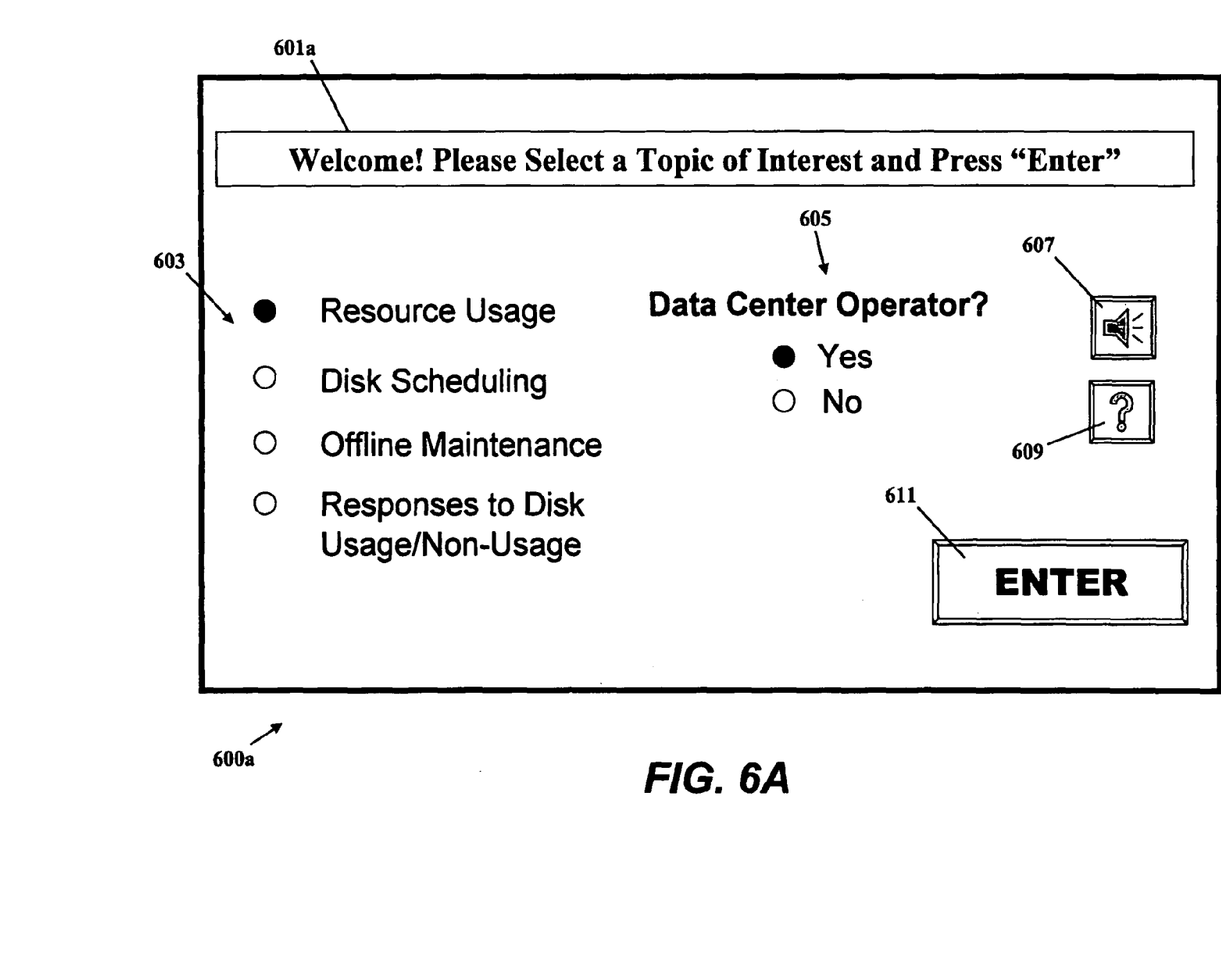
FIGS. 6A-6D are examples of graphical user interfaces ("GUIs") that may be used to implement, at least in part, the methods of FIG. 5.

An example of one such GUI is illustrated in FIG. 6A. Area 601a provides a welcoming message to the user and invites her to select a topic of interest. Examples of such topics are indicated in area 603. Area 605 allows the user to indicate whether she is a data center operator. If so, more detailed reporting criteria and/or other criteria of potential interest to data center operators may be presented in subsequent GUIs. In this example, area 607 will enable or disable an audio counterpart to the items indicated on GUI 600a, provide volume controls, etc. Here, area 609 will enable informational services such as search tools, access to frequently asked questions ("FAQs"), etc. Upon selection of the topic of interest, the user may select "Enter" 611.

Figure 5:
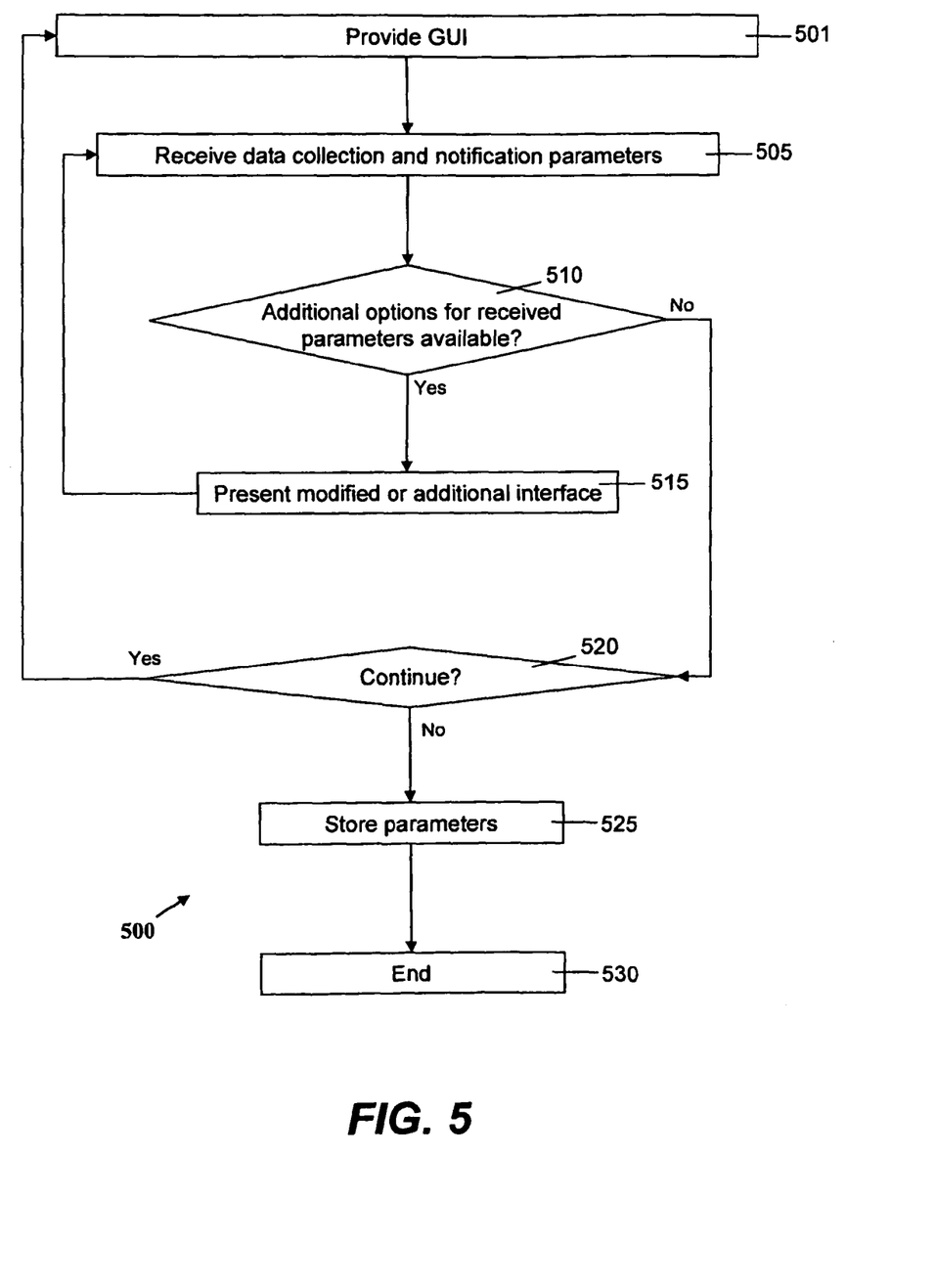
FIG. 5 is a flow chart that outlines steps of methods for receiving data collection and/or notification parameters relating to the provision of virtual desktops.

In step 505 of FIG. 5, data collection and/or notification parameters are received. In this example, the user has selected the "Resource Usage" option of area 603 (see FIG. 6A) and has indicated that she is a data center operator. Additional GUIs for related parameters are available, so it will be determined in step 510 (see FIG. 5) that additional options are available for the parameters received. When the user interacts with the "Enter" area 611 of GUI 600a, an additional interface will be presented (see step 515 of FIG. 5).

Figure 6B:
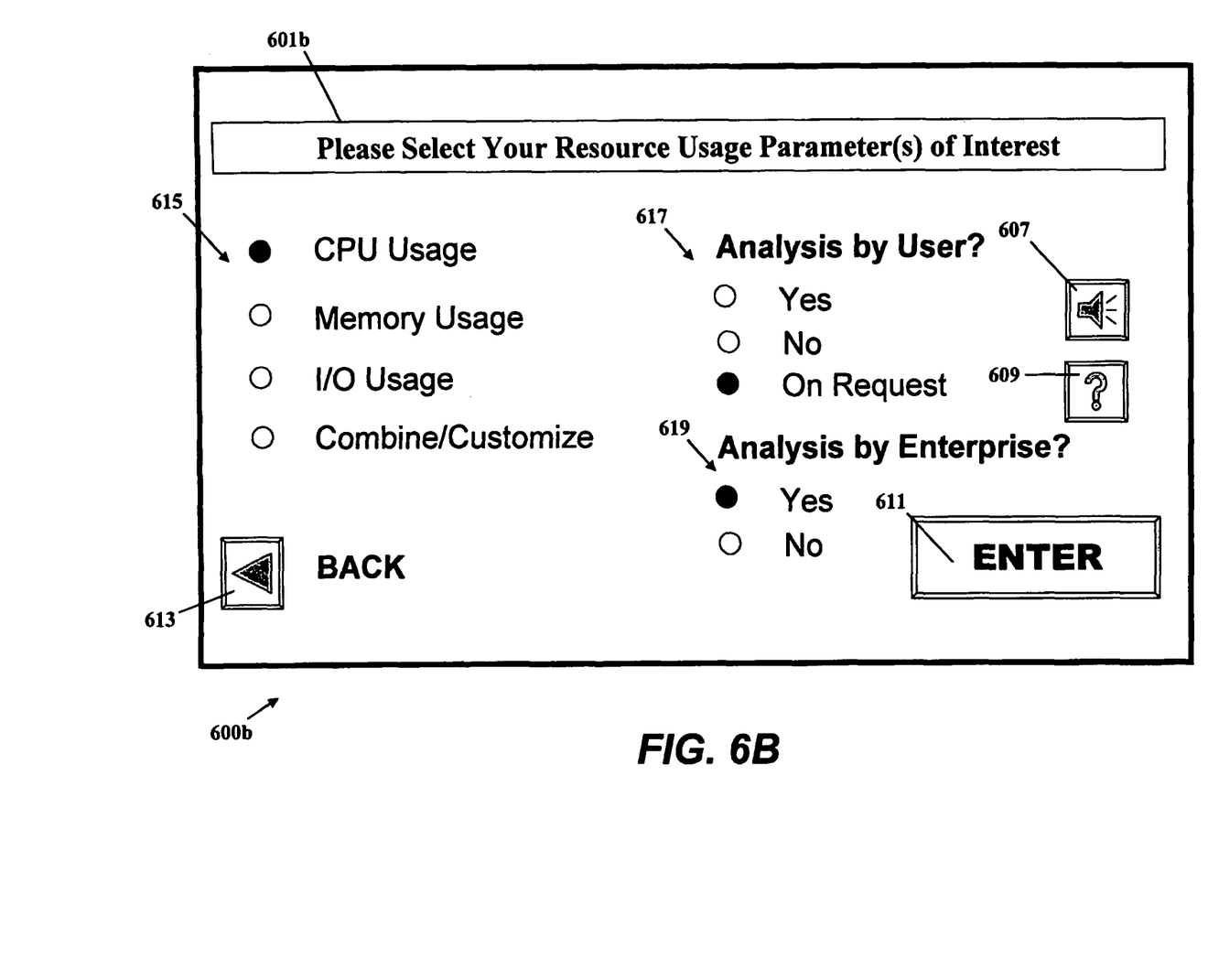

Because the user has indicated an interest in resource usage parameters, GUI 600b of FIG. 6B is presented next in this example. GUI 600b allows a user to select resource usage parameters of interest. Area 601b provides a message to the user prompting the user to select resource usage parameter(s) of interest. In this example, area 615 allows a user to select CPU usage parameters, memory usage parameters, input/output usage parameters, to select combinations of parameters and/or to indicate customized parameter types. Here, subsequent GUIs may be presented to obtain further details of interest for each category indicated in area 615. For example, notification and/or reporting thresholds for one or more categories may be indicated according to a slider, a selection of thresholds by check box, or in any other convenient fashion.

Area 617 allows the option of a user-based analysis for, e.g., the monitoring of resource usage of individual users. This option may also be provided on demand. Area 619 provides the option of monitoring resource usage at the enterprise level. Subsequent GUIs may provide, e.g., the option of monitoring resource usage for all users associated with an enterprise, of monitoring identified sub-groups. In some implementations, the sub-groups may be identified by function, e.g., engineering, accounting, and so on. Sub-groups may also be identified by time, e.g., the 9 to 5 shift, by usage during predetermined time periods (e.g., from 8 a.m. to 9 a.m.), by date ranges, etc. The user may return to a prior GUI by interacting with the "Back" arrow in area 613.

Figure 6C:
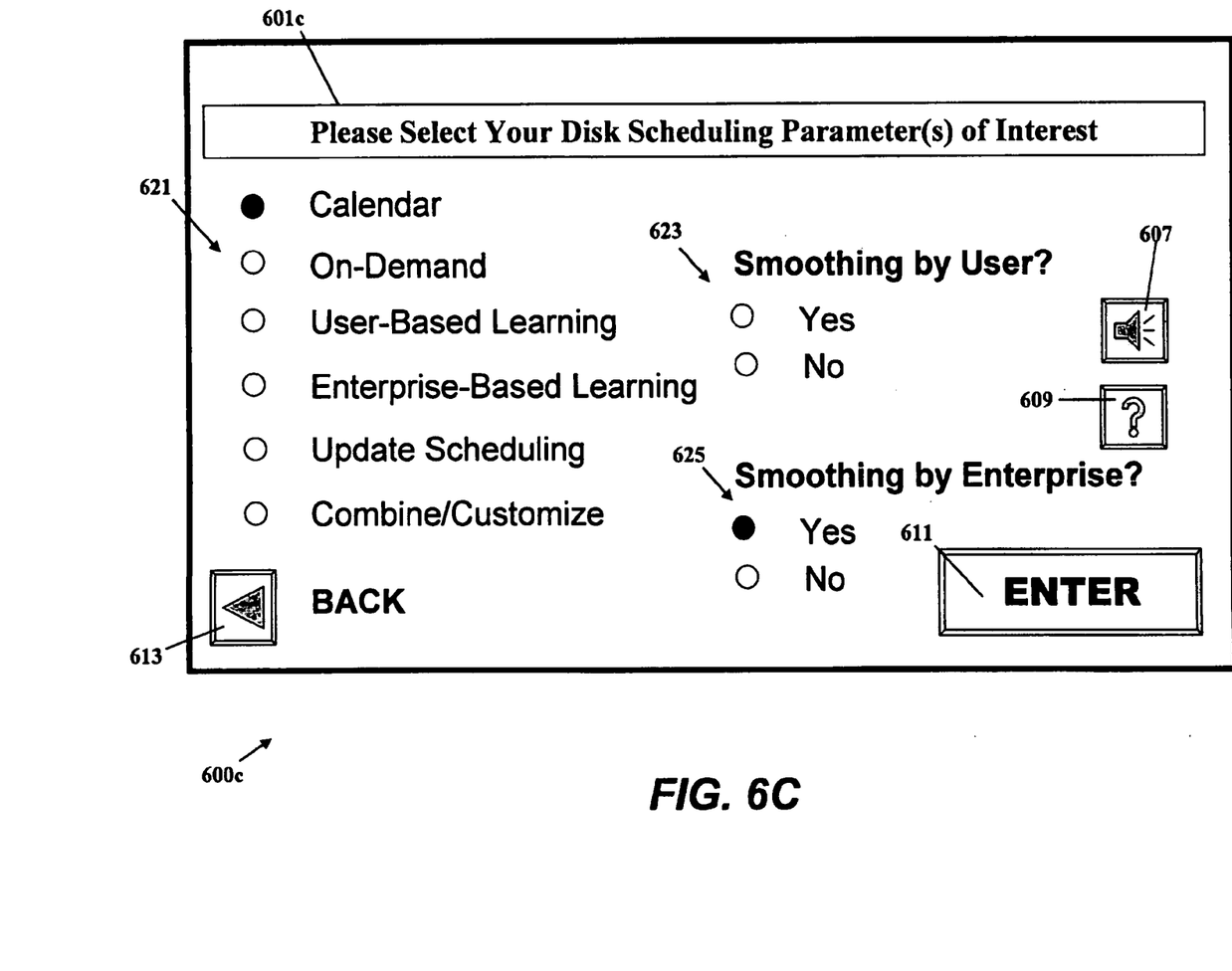

FIG. 6C is an example of a GUI 600c that may be presented when a user indicates an interest in disc scheduling, e.g., by selecting this topic in area 603 of GUI 600a (see FIG. 6A). Area 601c provides a message to the user prompting the user to select disk scheduling parameter(s) of interest. Area 621 allows a user to select various types of virtual disk scheduling options discussed elsewhere herein, including a calendaring feature, provision on demand (e.g., according to an indication from another device), scheduling based on historical data for a user and scheduling based on historical data for an enterprise. These selections may be combined and/or customized by interacting with subsequent GUIs (not shown).

The option of scheduling software updates is also provided in area 621. For example, a daemon may be configured to track when software updates occur, e.g., Art has consistently received an update for software A on Mondays at 8:00 a.m. and an update for software B on Wednesday at 3:00 a.m. If such updates are observed to happen on a regular basis, they could be factored into a schedule. In a subsequent GUI (not shown), a user could indicate that a notification be sent to a virtual disk scheduler when an update request is received. The user may indicate, e.g., that Art's virtual disk could be assembled and launched "offline" (during a time when the virtual disk is not scheduled to be ready for Art's use) so that Art's applications may be updated without interfering with his work schedule. An IT department may only want to "offline maintain" applications that are site licensed or registered for all of an enterprise's users or for a large segment of these users. However, this method can allow automatic "offline maintenance" for core applications or non-core applications, so that the user experience is not adversely impacted.

However, the user may determine that the virtual disk scheduler will only "offline maintain" unauthorized or personalized applications for selected users. It costs money to use data center resources. Launching a user's virtual disk in the middle of the night may result in additional costs if, e.g., an enterprise is outsourcing its data center.

Areas 623 and 625 allow the user to select various subsequent options for scheduling phased virtual disk assembly and/or boot times, e.g., as discussed above with reference to FIG. 3. Area 623 allows a user to select phased virtual disk assembly and/or boot times on a per-user basis. In some implementations, user sub-groups may be identified. Area 625 allows a user to select enterprise-based phased virtual disk assembly and/or boot times.

Figure 6D:
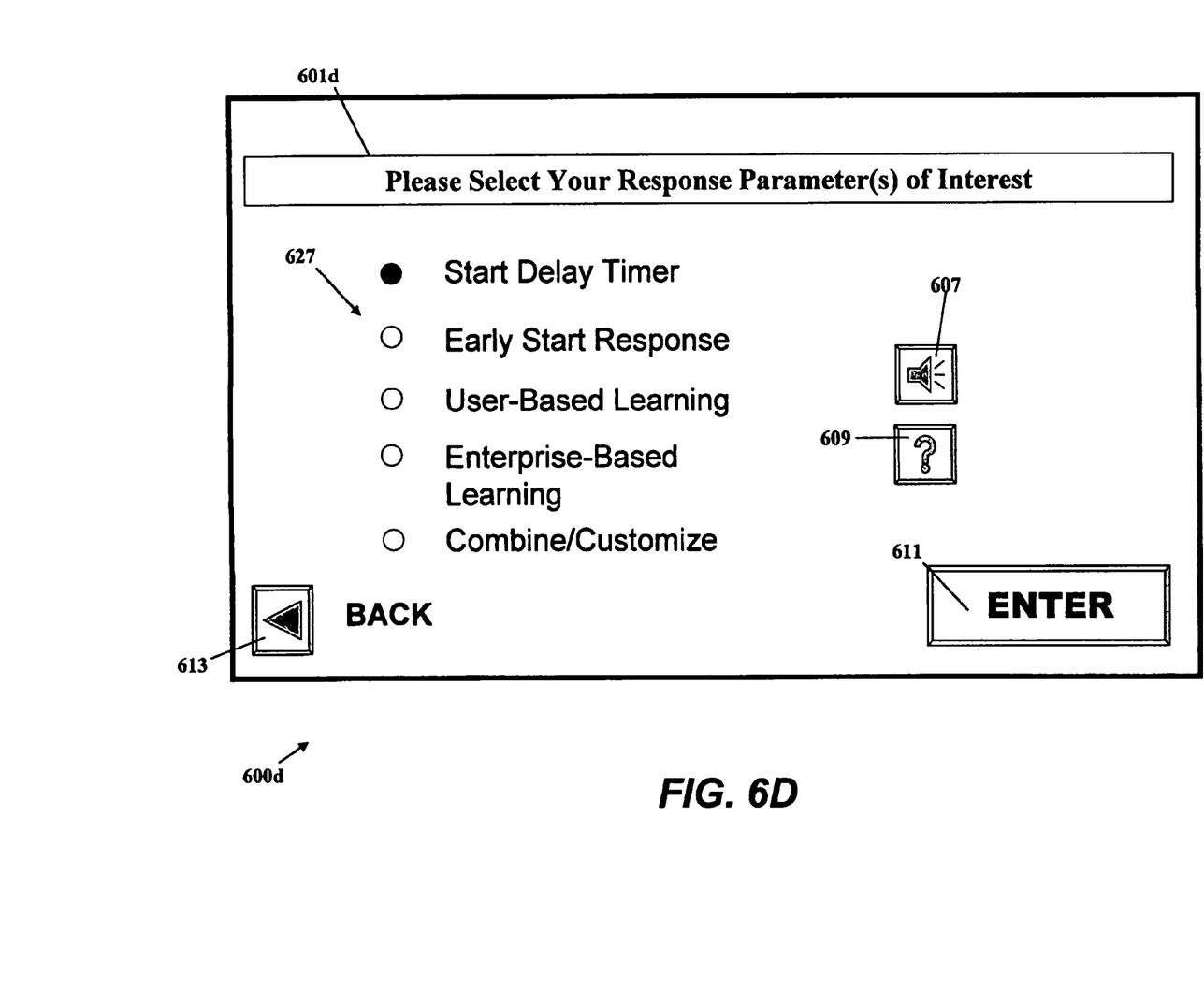

FIG. 6D is an example of a GUI 600d that may be presented when a user indicates an interest in responses to virtual disk usage or non-usage, e.g., by selecting this topic in area 603 of GUI 600a (see FIG. 6A). Area 601d provides a message to the user prompting the user to select response parameter(s) of interest. Area 627 allows a user to select various types of responses, including a start delay timer, an early start response, responses based upon user-based learning and/or responses based upon enterprise-based learning. These selections may be combined and/or customized according to user input on subsequent GUIs (not shown).

As long as the user wishes to continue (as determined in step 520 of FIG. 5) and there are additional relevant GUIs to present, process 500 will continue. Before process 500 terminates (step 530), the indicated parameters are preferably stored for future reference. (Step 525.) One or more daemons may be configured accordingly. Virtual disk schedulers may use the data acquired by such daemons as input for disk scheduling determinations.

Some entities may use the results of other entities' daemons and/or virtual disk schedulers as input for their own daemons and/or virtual disk schedulers. For example, suppose that a virtual disk scheduler has created an update registry, indicating when various types of software are scheduled to receive updates, according to input from a first daemon. Another daemon may interrogate the update registry to determine when a first application is scheduled to update, in order to avoid scheduling another update at the same time. If the operating system is scheduled to update, the virtual disk scheduler would know not to schedule an application or application bundle to update at the same time.

Figure 7:
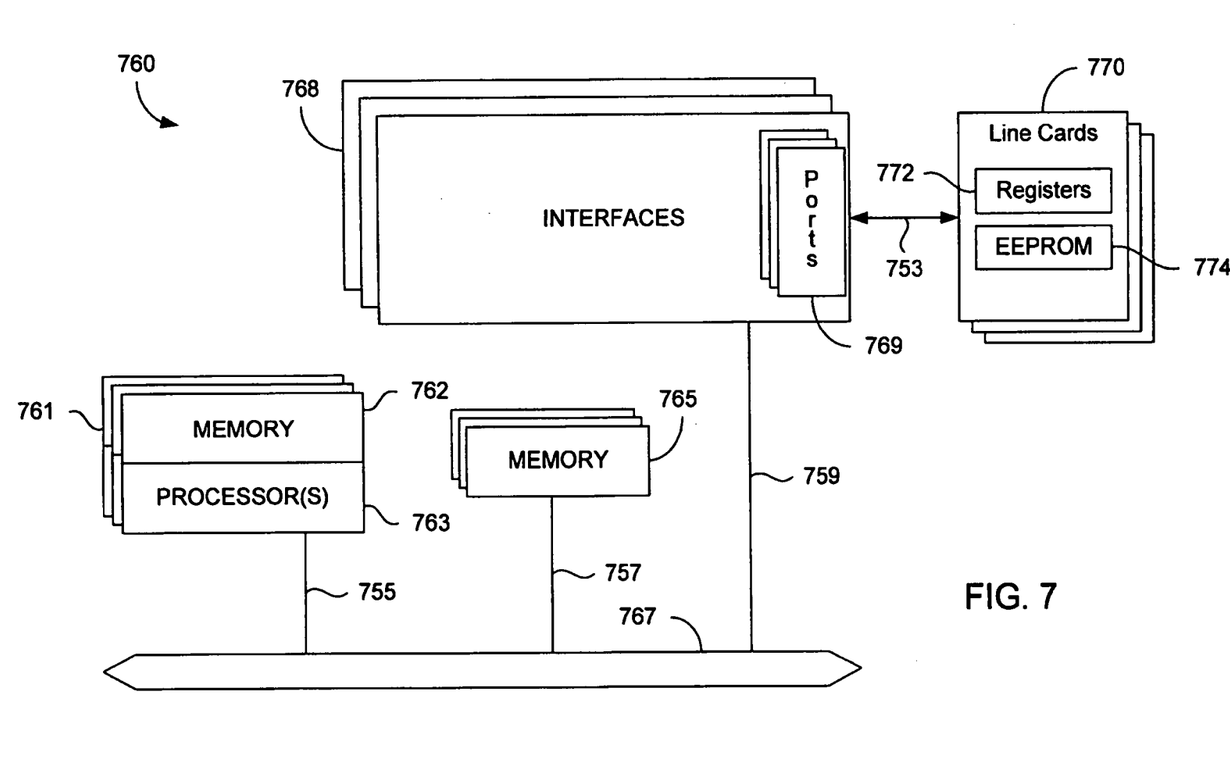
FIG. 7 is a diagrammatic representation of a network device in which some embodiments described herein may be implemented.

FIG. 7 illustrates an example of a network device that may be configured to implement some methods of the present invention. Network device 760 includes a master central processing unit (CPU) 761, interfaces 768, and a bus 767 (e.g., a PCI bus). Generally, interfaces 768 include ports 769 appropriate for communication with the appropriate media. The ports 769 may be connected to line cards 770 as shown at 753. In some embodiments, one or more of the line cards 770 includes one or more registers 772, at least one independent processor and, in some instances, memory 774 such as volatile RAM. Independent processors may be, for example ASICs or any other appropriate processors. According to some such embodiments, these independent processors perform at least some of the functions of the logic described herein. In some embodiments, one or more of interfaces 768 control such communications-intensive tasks as media control and management. By providing separate processors for the communications-intensive tasks, interfaces 768 allow the master microprocessor efficiently to perform other functions such as routing computations, network diagnostics, security functions, etc. CPU 761, which includes memory block 762 and independent processors 763, may be referred to collectively as a "logic system" or the like. Similarly, one or more processors, etc., of another device may be referred to as a logic system.

The interfaces 768 are typically provided as interface cards (sometimes referred to as "line cards"). The interfaces 768 may be connected to the bus 767 as shown at 759. Generally, the interfaces 768 control the sending and receiving of data packets over the network and sometimes support other peripherals used with the network device 760. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 761 may be responsible for implementing specific functions associated with the functions of a desired network device. According to some embodiments, CPU 761 accomplishes all these functions under the control of software including an operating system (e.g. Linux, VxWorks, etc.), and any appropriate applications software.

CPU 761 may include one or more processors 763 such as a processor from the Motorola family of microprocessors or the MIPS family of microprocessors. The processors 763 may be connected to the bus 767 as shown at 755. In an alternative embodiment, processor 763 is specially designed hardware for controlling the operations of network device 760. In a specific embodiment, a memory 762 (such as non-volatile RAM and/or ROM) also forms part of CPU 761. However, there are many different ways in which memory could be coupled to the system. Memory block 762 may be used for a variety of purposes such as, for example, caching and/or storing data, programming instructions, etc.

Regardless of network device's configuration, it may employ one or more memories or memory modules (such as, for example, memory block 765) configured to store data, program instructions for the general-purpose network operations and/or other information relating to the functionality of the techniques described herein. The memory block 765 may be connected to the bus 767 as shown at 757. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the system shown in FIG. 7 illustrates one specific network device of the present invention, it is by no means the only network device architecture on which the present invention can be implemented. For example, an architecture having a single processor that handles communications as well as routing computations, etc., may be used. Further, other types of interfaces and media could also be used with the network device. The communication path between interfaces/line cards may be bus based (as shown in FIG. 7) or switch fabric based (such as a cross-bar).

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

I claim:

1. A non-transitory machine-readable medium having software stored thereon, the software comprising instructions for controlling at least one device to perform the following tasks:
   detecting an occurrence of a first triggering event, wherein the detecting includes obtaining an indication that a first virtual disk is to be used at a first future time, wherein the detecting includes applying a rule set to the first virtual disk;

determining a first future assembly time that the first virtual disk is to be assembled in response to the triggering event based, at least in part, upon the first future time, the first virtual disk being assembled for a particular entity;

scheduling the first virtual disk to be assembled at the first future assembly time;

in response to determining that a connection request for the first virtual disk is not received from the particular entity within a predetermined time, associating the particular entity with a time increment;

detecting an occurrence of a second triggering event indicating that a second virtual disk is to be used at a second future time, the second virtual disk being assembled for the particular entity; and scheduling the second virtual disk to be assembled at the second future time plus the time increment.

2. The non-transitory machine-readable medium of claim 1, wherein the detecting-comprises referring to a calendar.

3. The non-transitory machine-readable medium of claim 1, wherein the detecting comprises referring to a database of observed user activity.

4. The non-transitory machine-readable medium of claim 1, wherein determining the first future assembly time comprises applying the rule set based on past behavior of a user.

5. The non-transitory machine-readable medium of claim 1, wherein the software further comprises instructions for controlling at least one device to determine whether a connection request is received for the first virtual disk during the predetermined time.

6. The non-transitory machine-readable medium of claim 1, wherein the software further comprises instructions for controlling at least one device to determine, upon receiving an indication to have N virtual disks ready at time T on a first day, whether to have at least some of the N virtual disks ready prior to time T.

7. The non-transitory machine-readable medium of claim 1, wherein the indication is received via Short Message Service ("SMS") protocol, email or Extensible Markup Language ("XML").

8. The non-transitory machine-readable medium of claim 1, wherein the indication is received via a voice system or a proprietary protocol.

9. The non-transitory machine-readable medium of claim 6, wherein the software further comprises instructions for controlling at least one device to perform the following tasks:
determining that fewer than N connection requests are received within a predetermined time of T on the first day;
receiving an indication to have N virtual disks ready at time T on a second day;
and determining to have fewer than N virtual disks ready at time T on the second day.

10. The non-transitory machine-readable medium of claim 6, wherein the software further comprises instructions for controlling at least one device to perform the following tasks:
determining that more than N connection requests are received within a predetermined time of T on the first day;
receiving an indication to have N virtual disks ready at time T on a second day; and
determining to have more than N virtual disks ready at time T on the second day.

11. The non-transitory machine-readable medium of claim 1, wherein determining the first future assembly time that the first virtual disk is to be assembled in response to the first triggering event comprises:
determining an expected time to assemble and initialize the first virtual disk; and
subtracting the expected time from the first future time.

12. The non-transitory machine-readable medium of claim 1, wherein the first virtual disk is assembled by customizing the first virtual disk based, at least in part, upon an event to occur at the first future time.

13. The non-transitory machine-readable medium of claim 1, wherein the software further comprises instructions for assembling and launching the first virtual disk offline when the first virtual disk is not scheduled to be ready for the particular entity.

14. The non-transitory machine-readable medium of claim 1, wherein the detecting is performed by a datacenter, the determining is performed by the virtual disk scheduler controlled by the datacenter, and the first virtual disk is assembled by the datacenter.

15. The non-transitory machine-readable medium of claim 14, wherein the occurrence of the first triggering event is from a broker.

16. A system, comprising:
means for determining that a first virtual disk be established by a first future time for a particular user or enterprise, the determination being performed based, at least in part, upon historical data, wherein the determining includes applying a rule set to the first virtual disk;
means for determining a first future assembly time at which the first virtual disk is to be assembled such that the first virtual disk is established by the first future time;
means for scheduling the first virtual disk to be assembled at the first future assembly time;
means for, in response to determining that a connection request for the first virtual disk is not received from the particular user or enterprise within a predetermined time, associating the particular user or enterprise with a time increment;
means for determining that a second virtual disk is to be established by a second future time for the particular user or enterprise; and
means for scheduling the second virtual disk to be assembled at the second future time plus the time increment.

17. The system of claim 16, further comprising:
means for charging a fee associated with the particular future time.

18. A system, comprising:
a network interface; and
a logic system comprising at least one logic device and configured for performing the following tasks:
determining that a first virtual disk is to be established by a first future time for a particular user based, at least in part, upon historical data associated with the particular user, wherein the determining includes applying a rule set to the first virtual disk;
determining a first future assembly time at which the first virtual disk will be assembled based, at least in part, upon the first future time by which the first virtual disk is to be established;
scheduling the first virtual disk to be assembled at the first future assembly time;

in response to determining that a connection request for the first virtual disk is not received from the particular user within a predetermined time, associating the particular user with a time increment;

determining that a second virtual disk is to be established by a second future time for the particular user; and scheduling the second virtual disk to be assembled at the second future time plus the time increment.

19. The system of claim 18, wherein determining that the first virtual disk be established by a particular future time comprises obtaining an indication, received via the network interface, to assemble the first virtual disk at a future time.

20. The system of claim 18, wherein determining that the virtual disk is to be established by the first future time comprises referring to a calendar of scheduled virtual disk assembly times.

21. The system of claim 18, wherein the logic system performs the determining task by referring to a database including the historical data of observed user activity.

22. The system of claim 18, wherein determining a future assembly time comprises applying the rule set based on the historical data indicating past behavior of the particular user.

23. The system of claim 18, wherein the logic system is further configured to determine whether a connection request is received for the first virtual disk, via the network interface, during the predetermined time.

24. The system of claim 18, wherein the system comprises a single device.

25. The system of claim 18, wherein the system comprises a plurality of devices.

26. The system of claim 18, wherein the logic system is further configured to charge a fee associated with the particular future time and/or the time increment.

27. The system of claim 18, wherein the applying the rule set to the first virtual disk comprising:

in response to a particular metric reaching a predetermined threshold value, sending an indication to a virtual disk scheduler controlled by a datacenter.

\* \* \* \* \*